May 25, 1937. C. R. BLOOD 2,081,472
ASPHALT CONDITIONING AND CHARGING DEVICE
Filed June 12, 1935 3 Sheets-Sheet 2
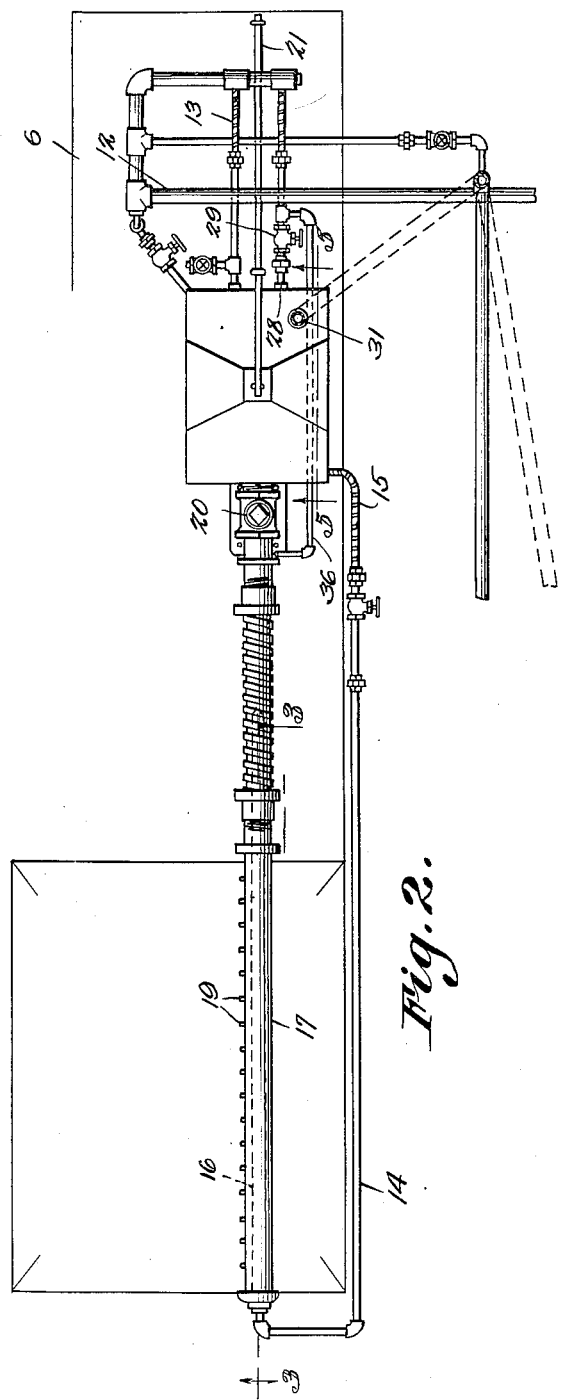
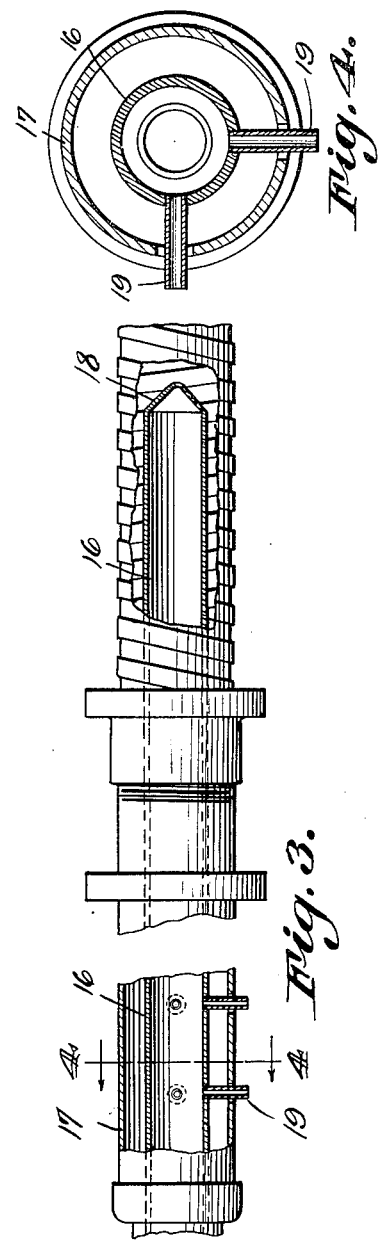
Inventor
C. R. Blood
By C. A. Snow & Co.
Attorneys.

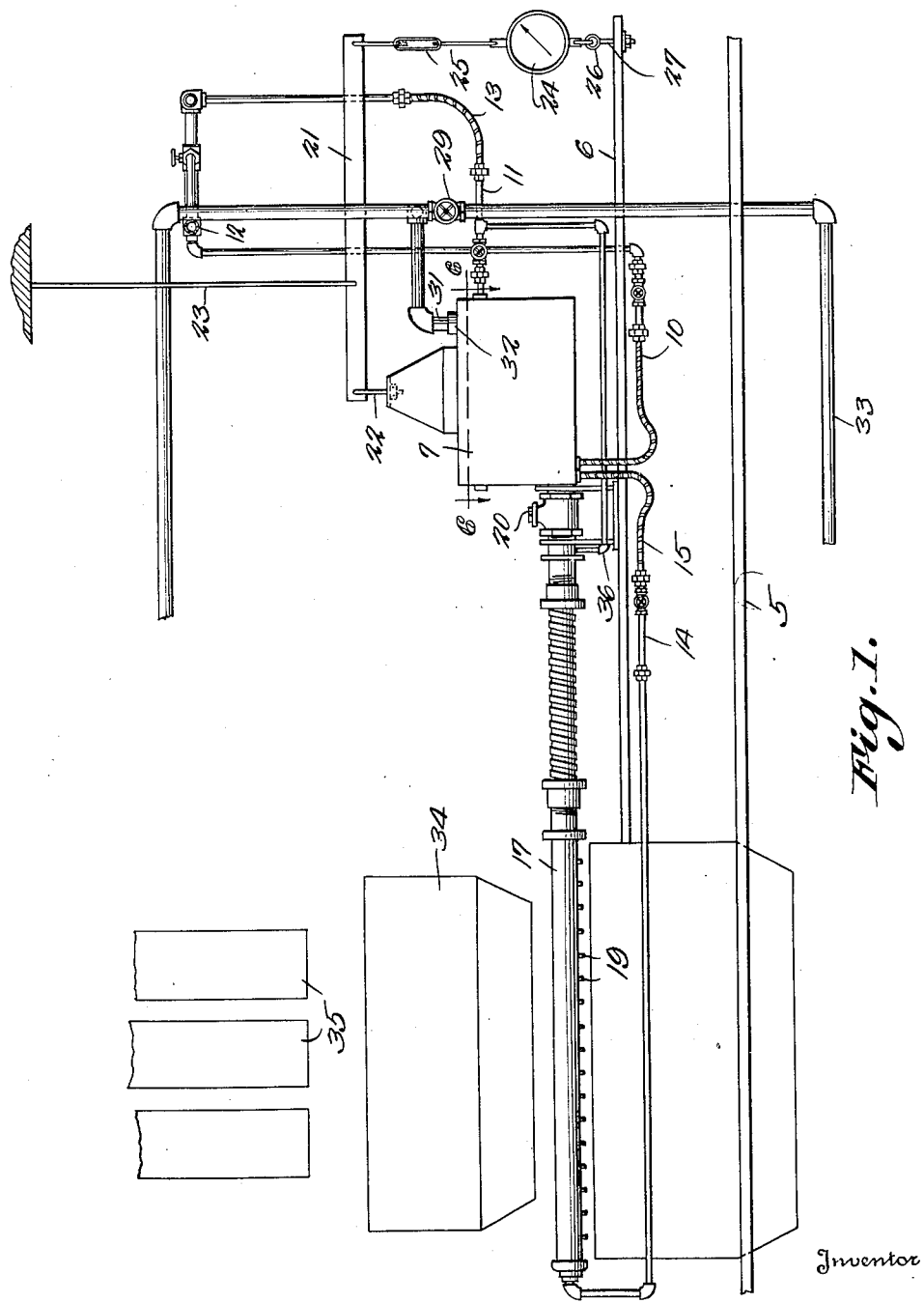

May 25, 1937.  C. R. BLOOD  2,081,472
ASPHALT CONDITIONING AND CHARGING DEVICE
Filed June 12, 1935  3 Sheets-Sheet 3

Inventor
C. R. Blood
By C. A. Snow & Co.
Attorneys.

Patented May 25, 1937

2,081,472

UNITED STATES PATENT OFFICE 2,081,472

ASPHALT CONDITIONING AND CHARGING DEVICE

Charles R. Blood, Sacramento, Calif., assignor of twenty-four per cent to W. H. Gerber, and twenty-four per cent to George S. Tyler Application June 12, 1935, Serial No. 26,309

2 Claims. (Cl. 94—43)

This invention relates to a device designed for use in the accurate conditioning of asphaltic material used as the cementing medium in asphaltic concrete.

An important object of the invention is to provide a machine which will deliver the material used, batch by batch, and with complete control over the condition of the asphalt to be used, through such means as superheating with steam, and the addition of emulsifying agents or solvents.

A further object of the invention is to provide a device of this character which will accurately measure by weight or volume, liquid asphalt and other liquids or materials in a high pressure container, means being provided for agitating and simultaneously heating the resultant mixture, by the application of jets of steam or air, under variable degrees of pressure.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a device constructed in accordance with the invention.

Figure 2 is a plan view thereof.

Figure 3 is an enlarged detail view partly broken away, and illustrating the manifold through which the material passes to the pugmill.

Figure 4 is a sectional view taken on line 4—4 of Figure 3.

Figure 5:
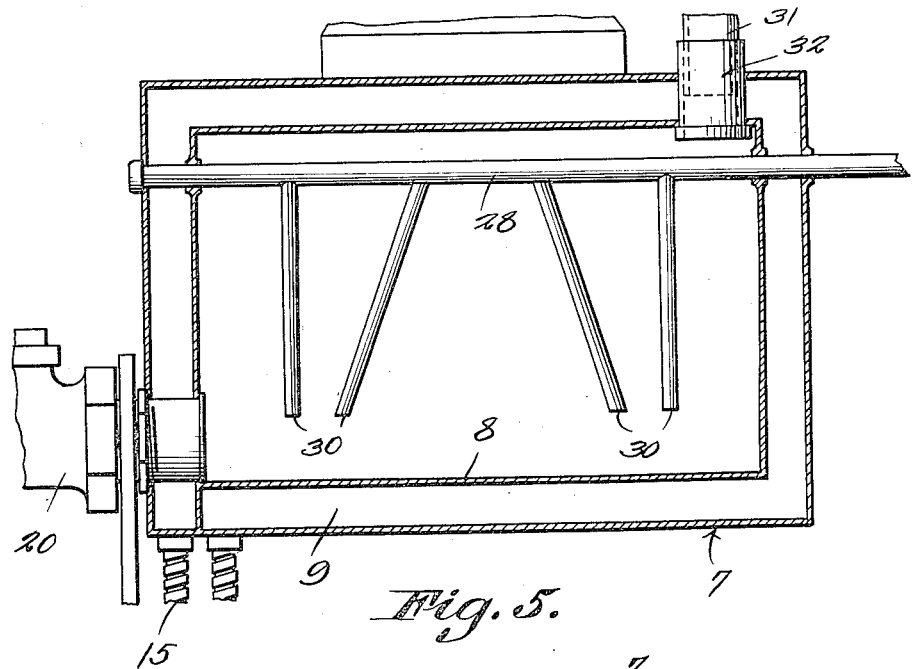
Figure 5 is a vertical sectional view taken on line 5—5 of Figure 2.
Figure 6:
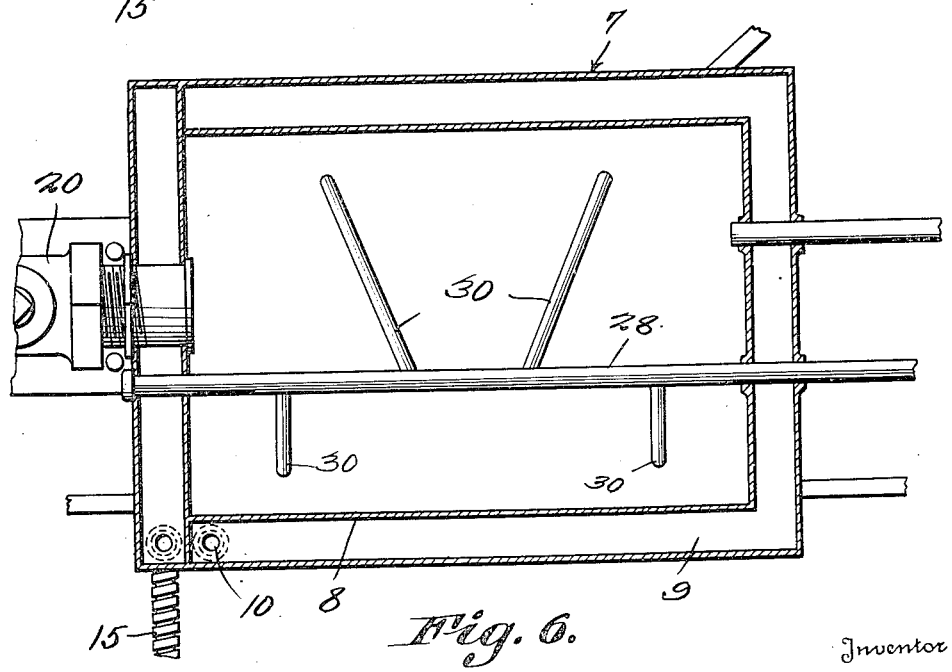
Figure 6 is a transverse sectional view through the weighing chamber taken on line 6—6 of Figure 1.

Referring to the drawings in detail, the device is mounted on the platform 5 and 6, and includes a weighing chamber 7 into which asphalt is discharged and weighed.

This weighing chamber 7 is provided with an inner wall 8 spaced from the outer wall and providing a steam jacket 9 into which steam enters, through the pipe 10, which pipe communicates with the steam pipe 11, that in turn connects with the main steam pipe 12. The connection between the pipes 11 and 12, is made through a system of pipes including the flexible pipe 13, whereby the weighing chamber may be free to move vertically.

An outlet steam pipe is indicated by the reference character 14 and is connected with one end of the steam chamber 9, through the flexible pipe 15, the pipe 14 being connected with the pipe 16 that extends into the manifold 17, supplying heat to the manifold. Since the inner end of the pipe 16 is closed at 18, it will be seen that the steam entering the pipe 16 will be placed under pressure. As clearly shown by Figure 3 of the drawings, the pipe 16 is of a diameter appreciably less than the diameter of the manifold 17, providing a wide space through which the asphalt passes.

Openings are formed in the manifold 17, the openings being larger by an appreciable degree than the nozzles 19 which are shown as extended through the openings, with the result that asphalt passing through the manifold and openings will be heated and maintained in a soft condition to readily flow through the openings.

This manifold 17 connects with the weighing chamber 7, the passage of asphalt from the weighing chamber being controlled by means of the valve 20. The manifold 17 is also constructed of flexible pipe material to permit the weighing chamber to move vertically and accomplish its purpose.

The scale beam forming a part of the weighing apparatus, is indicated by the reference character 21, and is connected with the weighing chamber 7, through the link 22, the scale beam being supported on the bracket 23 that is preferably hung from the ceiling of the building in which the device is positioned. The outer end of the scale beam 21 connects with the indicator 24, through the links 25, the indicator 24 being connected with the platform 6, through the medium of the hook 27. Thus it will be seen that when material is fed into the weighing chamber, the scale beam will be actuated, causing the weight of the material to register or be indicated on the indicator 24, with the result that the attendant may know the exact quantity of asphalt in each batch of material treated.

The reference character 28 discloses a steam pipe leading from a source of steam supply controlled by the valve 29, and as shown, this pipe is supplied with jets 30 that extend to points near the bottom of the weighing chamber 7, and direct steam to the asphalt mass contained in the weighing chamber. The asphalt material is fed to the weighing chamber, through the pipe 31, which extends into the collar 32 that in turn communicates with the interior of the weighing chamber. The passage of asphalt material is controlled by a suitable valve member, to the end that the desired quantity of asphalt may be discharged into the weighing chamber, insuring accuracy in the treating of the asphalt.

The pipe 33 connects with the asphalt supply pipe and returns a surplus asphalt to the sump, for further treatment when the material is pumped through the manifold 17.

A weighing hopper indicated by the reference character 34 is mounted above the pug-mill, and receives material from the chutes 35.

As the material in the weighing hopper 34, passes into the pug-mill, the material is subjected to jets of steam from the pipe 16, thoroughly heating the material and insuring every particle of material being coated with the asphalt material passing through the machine.

From the foregoing it will be seen that due to the construction shown and described the asphalt material is thoroughly heated and maintained in a liquid condition to thoroughly coat the material used in paving, and which is bound by the asphalt material. It might be further stated that due to this construction the exact amount of asphalt batch by batch, may be fed to the pug-mill, insuring the proper mixing of the materials. A pipe indicated by the reference character 36, extends to the front end of the manifold 17, the pipe 36 having communication with the steam pipe 11, whereby steam enters the manifold 17, maintaining the manifold warm at all times, preventing the asphalt material from solidifying.

Having thus described the invention, what is claimed is:

1. A device for treating and feeding liquid asphalt to a pug-mill, comprising a weighing chamber into which a batch of material is delivered and weighed, means for heating the contents of the weighing chamber, a manifold leading from the weighing chamber and having openings through which material is delivered to the pug-mill, a steam pipe closed at its inner end, extending into the manifold heating the material passing through the manifold, steam nozzles carried by the steam pipe and extending through the openings of the manifold in spaced relation therewith, whereby steam passing through the nozzles will act to draw material through the openings, depositing the material in the pug-mill.

2. A device for treating liquid asphalt and feeding the liquid asphalt to a pug-mill, comprising a heated weighing chamber, a manifold communicating with the weighing chamber and having openings through which material passes to the pug-mill, a steam pipe closed at its inner end and extending into the manifold, heating the material as it passes through the manifold, steam nozzles extending through the openings of the manifold and communicating with the interior of the steam pipe whereby the material passing through the opening around the nozzles, will be maintained in a liquid state.

CHARLES R. BLOOD.